Dec. 7, 1926.
P. BIDIN
1,609,685
BRAKE FOR TWO-WHEEL HAND TRUCKS
Filed June 19, 1925
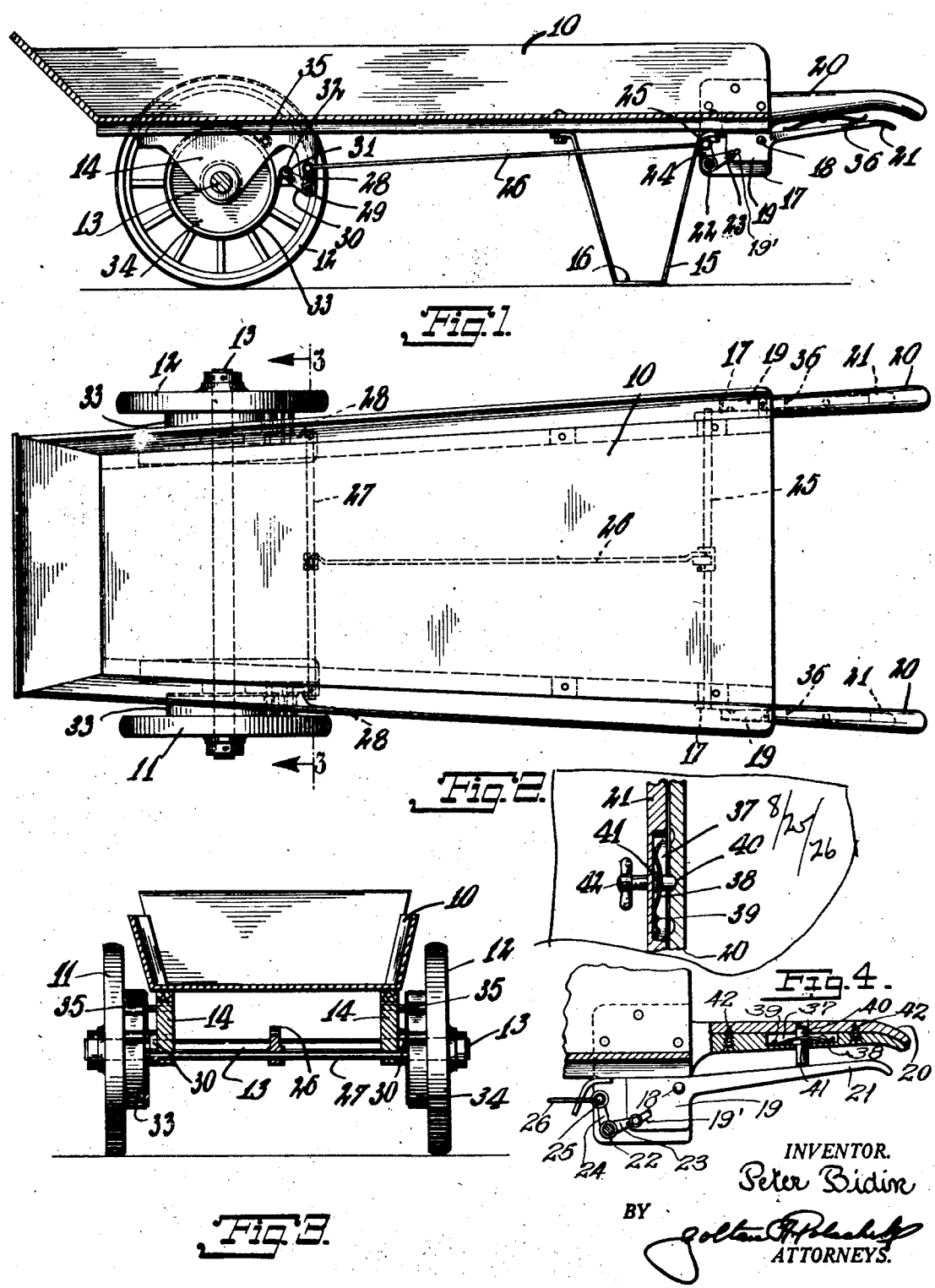

Patented Dec. 7, 1926.

1,609,685

UNITED STATES PATENT OFFICE.

PETER BIDIN, OF POWELL RIVER, BRITISH COLUMBIA, CANADA.

BRAKE FOR TWO-WHEEL HAND TRUCKS.

Application filed June 19, 1925. Serial No. 38,171.

This invention relates to improvements in hand-operated trucks, particularly two-wheeled trucks, and wheelbarrows, or the like, and it is the principal object of the invention to provide a brake for such vehicles.

Another object of the invention is the provision of a brake for hand operated trucks which can readily be set and released by the operator.

A further object of the invention is the provision of a brake for hand operated trucks, of simple and inexpensive construction adapted to be readily attached to any of the hand operated trucks or wheel-barrows at present in use, without the necessity of materially changing of their construction.

A still further object of the invention is the provision of a brake for hand operated trucks, allowing a simultaneous braking of both wheels thereof.

These and other objects and advantages of my improved brake for hand operated trucks and wheel-barrows, will become more fully apparent, as the description thereof proceeds, and will then be specifically defined in the appended claims.

In the accompanying drawing, forming a material part of this disclosure:

Fig. 1 is a side elevation, partly in section, of a hand truck, equipped with a brake constructed according to my invention.

Fig. 2 is a top plan view thereof.

Fig. 3 is a cross-section on line 3—3 of Figure 2.

Fig. 4 is a sectional detail view of a modification of the brake operating means.

A truck 10 or tray of any suitable well known construction, has its rear end supported by wheels 11 and 12 on axle 13 journaled in bracket 14 depending from the bottom of the tray. A pair of supporting legs 15, supports the front end of the truck on their shoes 16, made integrally therewith.

A pair of brackets 17, is attached to the front ends of the bottom of the truck and have laterally and pivotally attached thereto, as at 18, plates 19 having their upper edges extended underneath the handle 20 and formed into operating members 21. Enough space is allowed between the handle 20 and the operating member 21 for the operator of the device to normally grip the handle only. To apply the brakes the operator may support the device by one handle, and grip the other handle together with the operating member 21. Near the rear end of bracket plates 17, bell crank levers are fulcrumed, as at 22, the lever arms of which 23, are attached to slots 19' in the lower rear ends of plates 19, while their other arms 24, are connected at their upper ends by means of a transverse rod 25, having in approximately its center, pivotally secured thereto, an operating rod or bar 26, the other end of which is secured to a transverse bar 27 carrying at its outer ends, the arms 28, of bell crank levers fulcrumed at 29, the other arms, 30, of which, carry laterally disposed pins 31 engaging eyes 32, at the ends of brake bands 33, guided about brake drums 34 on the shaft 13 laterally disposed to the wheels 11 and 12 and attached at their other eye-shaped ends to pins 35. Curved springs 36, are attached in their middle to the handle 20 and rest with their outer ends upon the members 21.

The modification shown in Fig. 4 illustrates the handles 20 formed in two parts fastened together by screws 42, and one of said parts is provided with a chamber 37, a spring 38 is attached as at 39, to the chamber wall, while a pin 40, has a collar 41, attached thereto engaging the spring and extending from the member 21, whereby the member 21 may be manually pressed upwards to obtain functions as described before, and upon the releasing of member 21, the spring 38 acts to return said member to normal position.

The operation of the device will be entirely clear from the above description, if a braking of the truck is desired, the operator will compress springs 36 or 38, by hand to operate the bell crank levers and rods 25, 26 and 27, to tighten the brake bands around the drums on shaft 13, while a release of the pressure exerted will release the brakes.

It is to be understood that while I have shown and described one example only of the practical construction of my braking device, the same may be subject to changes, such as fall within the scope of the appended claims, without departure from the spirit and principle thereof.

Having thus described my invention, what I claim as new, and desire to secure by Letters Patent, is:

1. A brake for hand operated trucks, comprising a shaft, brake drums on said shaft, brake bands guided about said drums, having one of their eye-shaped ends secured to a pin on the truck, a set of bell crank levers having one of their arms secured to the eye-shaped free ends of said bands, an operating rod connecting the other arms of said bell crank levers, a second set of bell crank levers, a rod connecting the arms of said second set of bell crank levers, and a rod connecting the rods of both sets of bell crank levers, and a spring controlled operating means for said bell crank levers, rods and brake bands for setting and releasing the brake bands by hand.

2. In a brake mechanism for two-wheeled trucks, a braking means, two sets of connected bell crank levers and plates attached to the truck, bearing one set of said bell crank levers, handles on said truck, operating levers for said bell crank levers, and springs between said truck handles, and operating levers for normally holding the brake in its position of rest, and allowing a setting of the same by pressing said levers against said handles by hand.

3. In a brake mechanism for two-wheeled trucks, having an axle, a braking means for the truck axle, and means for operating said braking means to normally hold said brakes released but allowing a ready application of the brakes, said means comprising a pair of plates secured to the truck bell crank levers fulcrumed on said plates, a pair of bars, pivotally secured to said plates and having one arm of said bell crank lever attached thereto, truck handles, and springs between said bars and said truck handles, allowing a compression by hand to allow said bell crank levers to set the brakes, and to hold the same in position of rest when the pressure on the handle is relieved.

In testimony whereof I have affixed my signature.

PETER BIDIN.